United States Patent

[11] 3,587,000

[72] Inventor John Stuart Heeks
Harlow, England
[21] Appl. No. 779,416
[22] Filed Nov. 27, 1968
[45] Patented June 22, 1971
[73] Assignee International Standard Electric Corp.
New York, N.Y.
[32] Priority Feb. 22, 1968
[33] Great Britain
[31] 8740

[54] SEMICONDUCTIVE CIRCUIT
3 Claims, 5 Drawing Figs.

[52] U.S. Cl. 331/107, 317/234
[51] Int. Cl. H03b 7/06
[50] Field of Search 331/107, 107 G; 317/234-10, 235-21

[56] References Cited

UNITED STATES PATENTS 3,365,583 1/1968 Gunn 331/107
3,452,222 6/1969 Shoji 331/107

FOREIGN PATENTS 1,120,509 7/1968 Great Britain 331/107

OTHER REFERENCES

Shoji, IEEE TRANSACTIONS ON ELECTRON DEVICES. pgs. 535 to 546, Sept. 1967 331—107

*Primary Examiner*—John Kominski
*Attorneys*—C. Cornell Remsen, Jr., Walter J. Baum, Percy P. Lantzy, Philip M. Bolton, Isidore Togut and Charles L. Johnson, Jr.

ABSTRACT: This is a semiconductor device consisting of a material which exhibits high field instability effects when a potential which exceeds a critical value is applied across the device. Electronic means to vary the conductivity profile along the domain path is provided by having rectifying junctions along the side of the device to vary the minority carrier injections from one or more of the localized PN-junctions.

Inventor
JOHN S. HEEKS
By Charles Johnson
Attorney

Inventor
JOHN S. HEEKS
By Charles L. Johnson, Jr.
Attorney

SEMICONDUCTIVE CIRCUIT

BACKGROUND OF THE INVENTION

The invention relates to circuit arrangements incorporating semiconductive elements of a material exhibiting an inter-subband electron transfer mechanism giving rise to a bulk differential negative conductivity characteristic.

Examples of such materials are certain III—V semiconductors such as gallium arsenide and indium phosphide having *n*-type conductivity, and under certain conditions of low temperature *n*-type germanium also satisfies the above criteria.

Such materials have the property that if subjected to a steady electric field exceeding a critical value, the resultant current flowing through the material contains an oscillatory component. This is attributed to the repeated creation within the material of a high field domain. The domain propagates down the material and is extinguished thereby permitting the creation of a new domain.

For reasons which will become apparent from the ensuing description this invention is limited in its application exclusively to circuit arrangements including a semiconductive element of a material of the type exhibiting an inter-subband electron transfer mechanism giving rise to a bulk differential negative conductivity characteristic which has deep traps having a large capture cross section for minority carriers compared with their capture cross section for majority carriers. Hereinafter such material will be referred to as semiconductive material of the type herein before defined.

SUMMARY OF THE INVENTION

It is an object of this invention to provide improved means for varying the conductivity profile along the domain path in semiconductive elements of a material exhibiting an inter-subband electron mechanism.

According to a broad aspect of the invention there is provided a circuit arrangement including a body of semiconductive material of the type hereinbefore defined, means for applying a potential difference between spaced contact areas on said body thereby producing an electric field within the body, output means for detecting the current waveform associated with the propagation of a domain down the body, and means for injecting minority carriers into the body from one or more side contact areas suited between the spaced contact areas.

DESCRIPTION OF THE PREFERRED EMBODIMENTS

Since the known materials of the type hereinbefore defined are all N-type materials the ensuing description will be related to *n*-type material. However this invention should not be understood as to exclude from its scope the use of *p*-type material of the type hereinbefore defined. Should such material become available, it will be quite apparent that such material could be used in a complementary manner to use, which will now be described, of *n*-type material.

Figure 1:
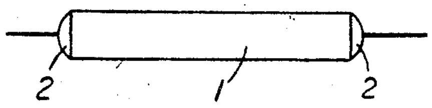
FIG. 1 is a diagrammatic representation of a body of *n*-type gallium arsenide located between two end terminals.
Figure 2:
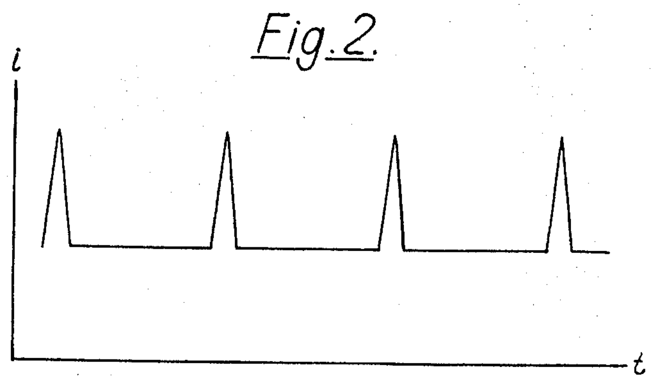
FIG. 2 shows the current waveform output of the device of FIG. 1.

FIG. 1 shows device made from a body 1 of *n*-type semiconductive material of the type hereinbefore described. The material of the body is uniform and so is its cross section. The ends of the body are equipped with terminals 2 so that a potential difference may be applied to the body. If a steady potential difference is applied resulting in an electric field in excess of a critical value the current waveform is as depicted in FIG. 2, where the time interval between consecutive current spikes is equal to the transit time of a domain between the ends of the body.

Figure 3:
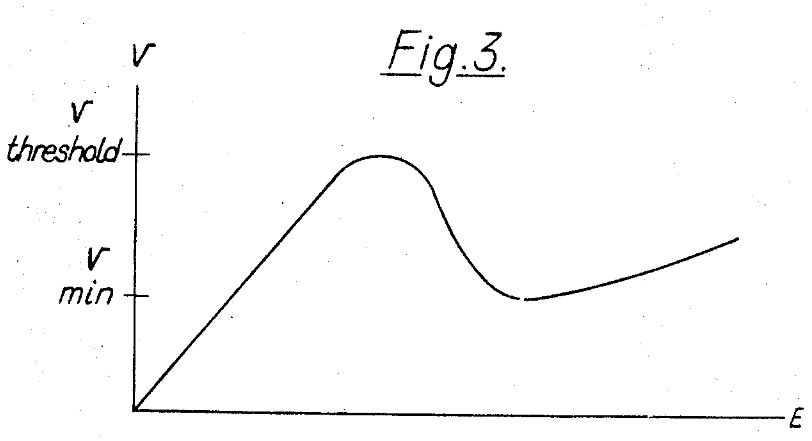
FIG. 3 is a graph of electron drift velocity plotted against electric field for a material such as *n*-type GaAs showing a bulk differential negative conductivity.
Figure 4:
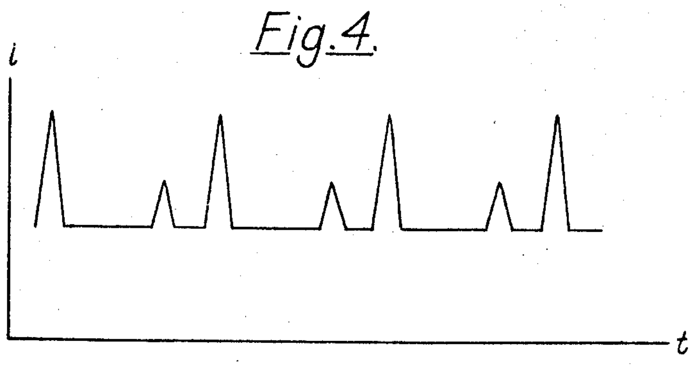
FIG. 4 shows the current waveform output of the device of FIG. 1 modified to have within its length a band of higher conductivity material.

This current waveform can be explained by reference to FIG. 3 which shows a typical characteristic of electron drift velocity $v$ plotted against field strength E. For *n*-type gallium arsenide the ratio of $v$ threshold to $v$ is approximately 2 to 1. The current flow through the body is determined by the product of the number of carriers with their drift velocity. Initially, as a domain is formed, the current passes through a maximum proportional to $v$ threshold; then, once the domain is formed, the current through the body is limited by the carrier drift velocity in the domain, which to a first approximation, is equal to $v$. Therefore in FIG. 2 the current in the valleys is approximately half the peak current of the spikes. If however the domain is caused to propagate through a nonuniform body having local areas with an increased carrier concentration, then the current will be correspondingly increased as the domain passes through these areas. FIG. 4 shows a typical current waveform for a body having in its length a single band of greater conductivity. In this case in each cycle the current makes a single excursion from its steady intercycle level. There is however a limit to the increase in conductivity which can be tolerated without disturbing the repetition frequency. This is because if the domain encounters a conductivity which makes the resulting current increase to the peak value required for forming that domain, a new domain is formed, and the original one is immediately extinguished before it has had time to travel the full length of the body.

However while working within this limit it is possible to obtain a predetermined current waveform output from a body having along its length the required conductivity profile. Such a device can be operated in a free running mode in which the applied voltage is always in excess of that required to create a domain. Alternatively it can be operated in a triggered mode in which case the voltage is sufficient to sustain a domain, once it has been formed, but a new domain is not created until a trigger pulse is superimposed on the standing bias. The required conductivity profile can be achieved either by selective doping along the body or by shaping the body to give it a nonuniform cross section.

The disadvantage of such means of achieving the required conductivity profile is that it is preset. This invention is concerned with a circuit arrangement in which the conductivity profile of the body can be setup electronically and can therefore be changed at will.

One way of setting up the required conductivity profile is to set it up by the propagation of a domain down a body of *n*-type gallium arsenide. The voltage bias applied to the body as this domain propagates is so large that it causes impact ionization to occur in the neighborhood of the domain. By varying the amount of the bias as the domain propagates it is possible to create a specific distribution of impact ionization along the length of the body. The impact ionization creates electron hole pairs, and while the holes are trapped relatively quickly, the lifetime of the excess electrons is of the order of 350 ns. During their lifetime these excess electrons superimpose a conductivity profile on the body according to their distribution.

The difference in lifetime of the two types of carrier created by impact ionization is due to the presence in the material of deep lying traps formed by acceptors. At room temperatures these acceptors, being in *n*-type material, are normally filled and so become negatively charged. In this state they present a relatively large capture cross section for holes, whereas when they capture a hole their charge is neutralized and so without the Coulomb attraction their subsequent capture cross section for electrons is correspondingly smaller.

Such traps appear to be naturally present in samples of *n*-type gallium arsenide presently available through their origin is not known. Two theories have been advanced to account for their existence, either that they are formed by defects in the crystal lattice or that they are formed by oxygen present in the lattice as an impurity. To produce other materials of the type defined it may however be necessary deliberately to introduce an impurity into the basic material in order to produce the required traps.

The same trapping mechanism referred to above in connection with impact ionization is utilized to set up a particular conductivity profile in the circuit arrangement of the present invention, with the difference that instead of using impact ionization to create electron pairs to neutralize the traps, they are neutralized by the direct injection of holes from one or more rectifying junctions located on the side of the body.

Figure 5:
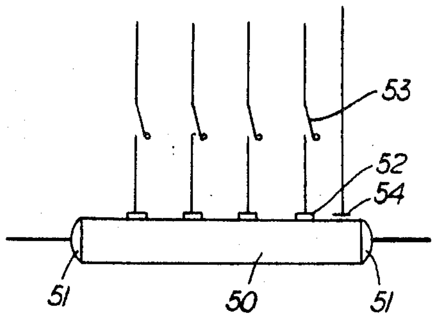
FIG. 5 is a diagrammatic representation of a body of gallium arsenide included in a circuit arrangement according to the present invention.

With reference to FIG. 5 the circuit arrangement according to this invention consists of a body 50 of *n*-type gallium arsenide terminated at each by an end contact 51. Connection is made from these contacts 51 to a voltage source, not shown, so that a potential difference may be developed across the body 50. On the side of the body are formed a set of rectifying side contact areas 52 made from *p*-type material, and these are individually connected via isolating switches 53 to sources of potential, also not shown. The output current waveform associated with the propagation of a domain down the body may either be detected in the circuit used for applying the potential difference between the end contacts 51 or alternatively may be derived from a capacitively coupled probe indicated at 54.

To operate the circuit arrangement a conductivity profile is set up before a domain is launched by forward biassing the side contact 52 so that holes are injected from them into the body. Then the potential difference between the end contacts 51 is raised so that a domain is created.

The side contacts 52 either have to be isolated before a domain passes, or their potential has to be dropped as it passes, if the domain is to be able to proceed beyond the contact, for otherwise the drop in potential of that part of the body under a side contact with the passage through it of a domain would result in the junction becoming forward biassed. If this were to happen the subsequent current flow through the side contact would build up until it reached a sufficient value for a new domain to be created. As explained previously the creation of a new domain automatically results in the extinction of the old one. In this circuit arrangement the side contacts are arranged to be capable of being isolated and the isolating means are represented as switches 53 in FIG. 5.

Of course, the converse is true, namely that isolation is not necessary if the side contacts are merely being used to alter the free running frequency of the body by deliberately arranging to extinguish domains at a particular side contact.

The lifetime of a particular conductivity profile, assuming that it is not reset between each domain transit is determined by the capture cross section of majority carriers by the deep lying traps. As explained above this capture cross section is relatively small because of the absence of Coulomb attraction and so such circuit arrangements can be used as short term memory devices. For *n*-type gallium arsenide the lifetime is of the order of 350 ns. Alternatively if the conductivity profile can be regularly reset the circuit arrangement can be used as a coder.

Provided that it has been electronically set up, it should be possible to erase a given conductivity profile by optical quenching using light of the appropriate photon energy required to excite electrons from the valence band into the traps.

I claim:

1. A semiconductor device including a body of semiconductive material of one conductivity type, said material exhibiting an inter-subband electron transfer mechanism comprising:
   means for applying a potential difference between spaced contact areas on the body thereby producing an electric field within the body; and
   semiconductive material of opposite conductivity type forming at least one rectifying P-N junction along a side of said body in the direction of the propagation of a domain down the body whereby the conductivity profile along the path of said domain is varied by the injection of minority carriers across said junction into said body.

2. A semiconductor device as claimed according to claim 1 wherein the body of semiconductive material is *n*-type.

3. A semiconductor device as claimed according to claim 2 wherein the body of semiconductive material is gallium arsenide.